Figures 1, 2, 3:
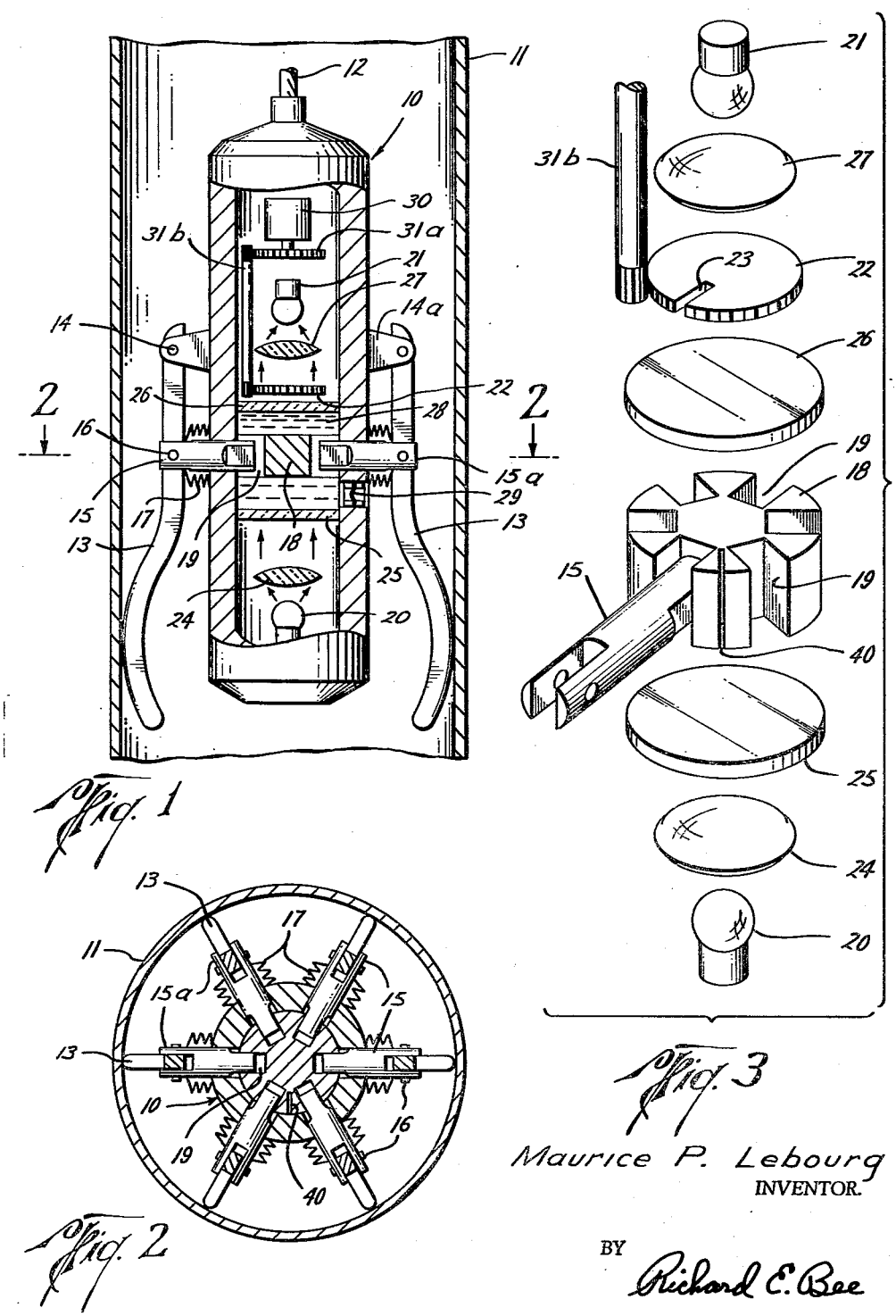

Aug. 8, 1961     M. P. LEBOURG     2,994,962
TUBING MEASURING APPARATUS USING PULSE SEQUENCES
Filed Dec. 19, 1957     3 Sheets-Sheet 1

Maurice P. Lebourg
INVENTOR.

BY Richard E. Bee
ATTORNEY

Maurice P. Lebourg
INVENTOR.

BY Richard E. Bee
ATTORNEY

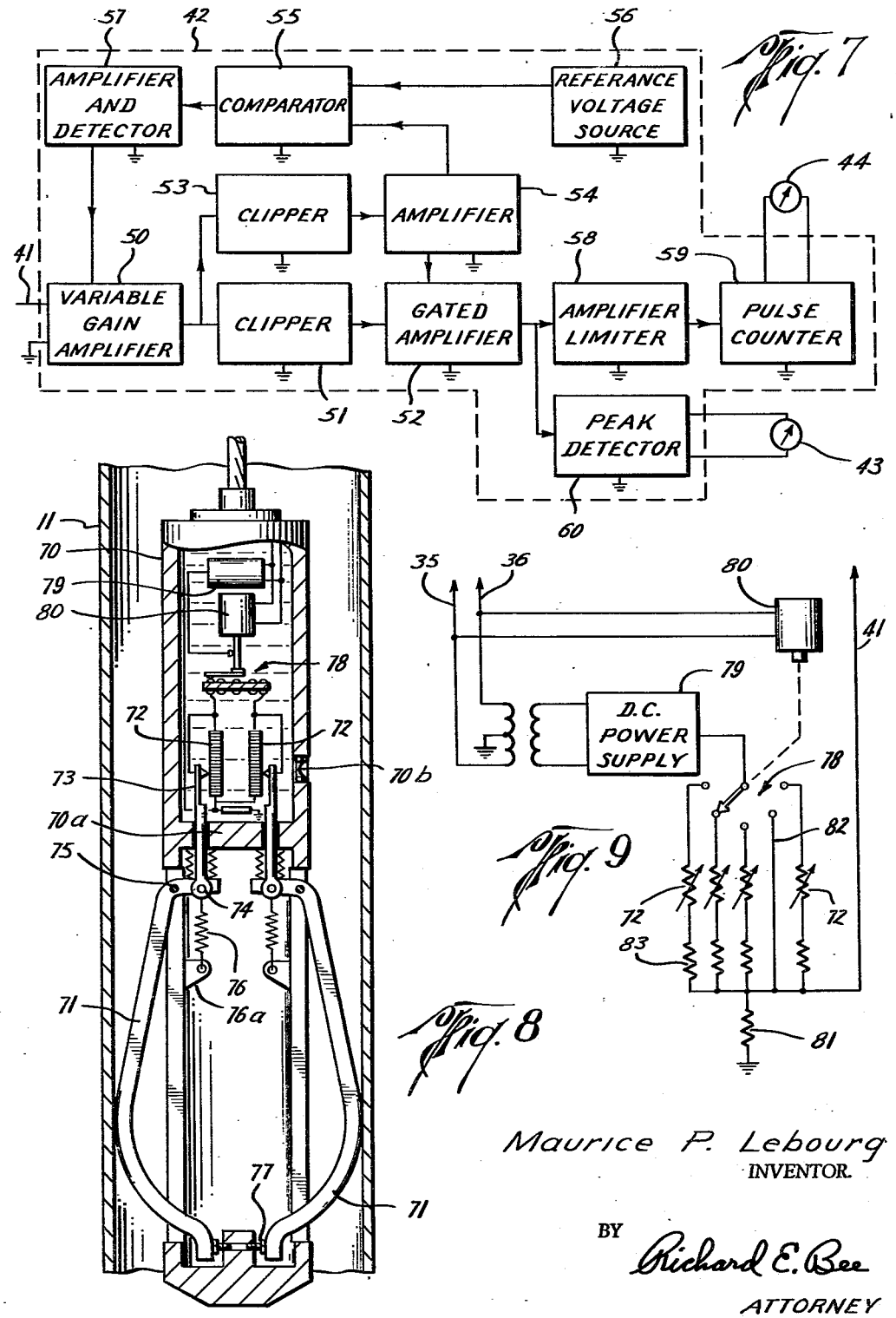

United States Patent Office 2,994,962
Patented Aug. 8, 1961

2,994,962
TUBING MEASURING APPARATUS USING PULSE SEQUENCES
Maurice P. Lebourg, Houston, Tex., assignor to Schlumberger Well Surveying Corporation, Houston, Tex., a corporation of Texas
Filed Dec. 19, 1957, Ser. No. 703,871
10 Claims. (Cl. 33—178)

This invention relates to measuring apparatus and, particularly, to such apparatus for measuring the internal dimensions of various kinds of tubular structures such as casing structures, pipe, boreholes, and the like. The present invention is especially useful in wells or boreholes drilled deep into the earth for obtaining the internal dimensions of the uncased borehole or of casing pipe or tubing subsequently placed in the borehole.

Periodic measurement of the internal dimensions of tubular structures such as metal pipe or casing are important in order to determine whether any corrosion or bulging of the pipe has occurred or whether undesirable amounts of scale deposit have formed on the inner wall. For uncased boreholes, the measurement of such internal dimensions enables the location of caved-in soft formations to be ascertained and provides information useful in calculating the amount of cement that may be required in subsequent cementing operations.

Various types of apparatus for measuring the internal dimensions of tubular structures have been heretofore proposed. One type includes a support housing having a number of feeler arms for engaging the inner wall of the tubular structure as the housing is moved longitudinally therethrough. The movement of each feeler arm then serves to drive a recording pen on a drum-type recording chart contained in the housing. This type of apparatus has the disadvantage that the results of the measurements are not immediately available to the operator and thus the operator has no way of knowing whether the apparatus is operating correctly until after the run has been completed.

Another type of previously proposed apparatus for measuring internal dimensions includes a number of feeler arms mechanically coupled to a common electrical element, such as a potentiometer, for adjusting the electrical characteristics thereof. The variation of such electrical characteristics controls an electrical signal which is developed and transmitted to a recording unit at the surface of the well or exterior to the tubular structure. This type of apparatus suffers from the disadvantage that adjustment of the common electrical element is usually restrained by the particular feeler arm which is displaced by the least amount. Consequently, the resulting indication relates only to the minimum dimension in a single direction and does not afford any indication of the shape or symmetry of the inner wall in a circumferential sense. As a result, such an indication does not afford a complete picture of the cross-sectional shape of the tubular structure.

It is an object of the invention therefore to provide new and improved tubing measuring apparatus which substantially avoids one or more of the foregoing limitations of such previously proposed apparatus.

It is another object of the invention to provide new and improved tubing measuring apparatus which affords immediate visual indications to the operator and provides a more complete and accurate picture of the internal dimensions of tubular structures.

It is an additional object of the invention to provide new and improved tubing measuring apparatus which is responsive to signals from a plurality of feeler arms for providing a single, readily interpretable and continuous indication of the degree of circumferential symmetry of the inner wall of a tubular structure.

In accordance with the invention, tubing measuring apparatus comprises a support housing adapted to be moved through a length of tubing under test. The housing includes a plurality of feeler members attached thereto and adapted to be urged against the wall of the tubing. The apparatus further includes transducer means coupled to each feeler member for developing a sequence of output signal components where each component in the sequence has a value representative of the displacement of one of the feeler members. The apparatus additionally includes means responsive to the sequence of output signal components for providing an indication of the internal dimensions of the tubing. In particular, means are included for providing an indication of the degree of circumferential symmetry of the inner wall of the tubing.

In one embodiment of the invention, the transducer means includes individual mechanical-to-optical transducers coupled to each of the feeler members and including in each case a movable shutter member which is controlled by movement of the feeler member to vary the amount of light passing through an aperture, there being one such aperture for each feeler member. Such transducer means further includes an optical-to-electrical photoelectric transducer and a selector member for enabling the light from only one aperture at a time to be supplied to the photoelectric transducer thereby to produce a sequence of electrical output pulses.

In another embodiment of the invention, the transducer means includes a plurality of mechanically adjustable electrical elements individually coupled to one of the feeler arms so that an electrical output signal may be developed for each feeler arm which is representative of the mechanical adjustment thereof. Such transducer means also includes a commutator switch for enabling a composite output signal to be developed which contains a sequence of output signal components where each such component is representative of the displacement of one of the feeler members.

For a better understanding of the present invention, together with other and further objects thereof, reference is had to the following description taken in connection with the accompanying drawings, the scope of the invention being pointed out in the appended claims.

Figure 4:
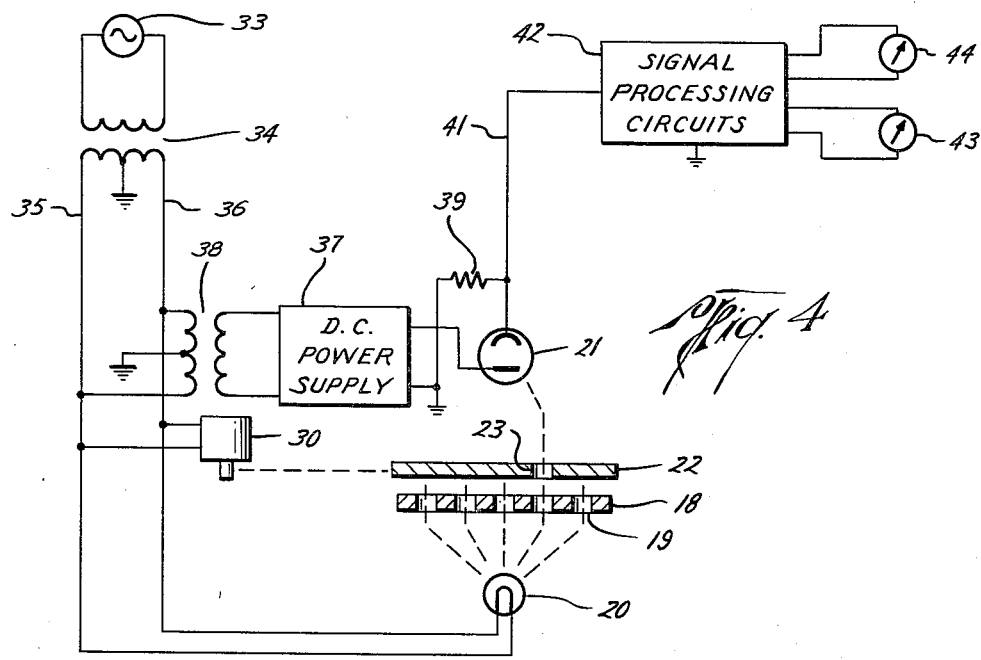
Figure 5:
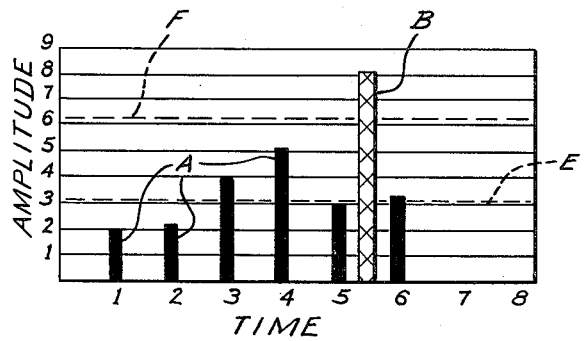
Figure 6:
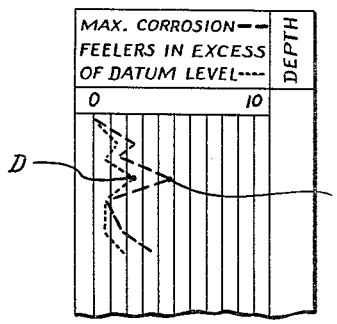

Referring to the drawings:
FIG. 1 is a partly-sectional elevational view of a representative embodiment of tubing measuring apparatus constructed in accordance with the present invention;
FIG. 2 is a cross-sectional view taken along the section line 2—2 of the apparatus of FIG. 1;
FIG. 3 is an exploded view of a portion of the apparatus of FIG. 1;
FIG. 4 is a schematic wiring diagram for the apparatus of FIG. 1;
FIG. 5 is a graph used in explaining the operation of the apparatus of FIG. 1;
FIG. 6 illustrates a form of continuous record which may be made with the apparatus of FIG. 1;
FIG. 7 is a block diagram of signal processing circuits which may be used with the apparatus of FIG. 1;
FIG. 8 is a cross-sectional view of another embodiment of tubing measuring apparatus constructed in accordance with the present invention; and
FIG. 9 is a schematic wiring diagram for the apparatus of FIG. 8.

Referring now to FIG. 1 of the drawings, there is shown a representative embodiment of tubing measuring apparatus constructed in accordance with the present invention for providing an indication of the internal dimensions of a length of tubing under test. Such apparatus includes a support housing 10 adapted to be moved through a length of tubing 11. Where the tubing runs in a generally vertical sense as illustrated in FIG. 1, an armoured cable 12 is provided for raising and lowering the support housing 10. Included within the cable 12 are a plurality of insulated conductors for making electrical connections between equipment at the surface or exterior to the tubing and electrical elements contained within the housing 10. Movably attached to the support housing 10 are a plurality of feeler members represented by feeler arms 13 which are adapted to be urged against the inner wall of the tubing 11. The positioning of the plurality of feeler arms 13 around the support housing 10 is best seen in the cross-sectional view of FIG. 2. Each feeler arm 13 is pivoted at a point 14 by means of a pin passing through an ear 14a protruding from the housing 10 and is secured at a point 16 by a pin passing through the forked end 15a of a piston 15. Each feeler arm 13 is urged against the inner wall of the tubing 11 by means of a resilient bellows or spring member 17 surrounding the piston 15.

The tubing measuring apparatus of the present invention also includes transducer means coupled to each of the feeler members 13 for developing a sequence of output signal components, each component in the sequence being representative of the displacement of one of such feeler members 13. In the case of the FIG. 1 apparatus, such transducer means includes a plurality of transducer mechanisms, each of which consists of a mechanical-to-optical transducer and an optical-to-electrical photoelectric transducer coupled in cascade, each such pairing of transducers being associated with one of the feeler arms 13. The mechanical-to-optical transducer portion of the apparatus includes an opaque structure represented by an opaque plate 18 mounted within the support housing 10, such structure or plate 18 having a plurality of light transmissive apertures formed in part therein by slots 19. An additional aperture 40 may be provided therein for enabling calibration of the apparatus. These apertures may be best seen in the exploded view of FIG. 3. The optical transducer portion also includes a light source 20 positioned on one side of the plate 18. In addition, it includes a plurality of movable shutter members represented by the pistons 15 which are individually coupled to one of the feeler members 13 and adapted to alter the amount of light passing through the apertures or slots 19 by altering the size of the aperture in accordance with the displacement of the corresponding feeler member 13.

The photoelectric transducer portion of the apparatus is represented by a photoelectric cell 21 positioned on the other side of the opaque plate 18. As shown, one photoelectric cell may serve as a common optical-to-electrical transducer element for all of the individual mechanical-to-optical transducer elements of the overall transducer means.

In addition, the transducer means includes a movable selector member represented by disc 22 and having a light transmissive aperture 23 therein for enabling the light from only one of the apertures 19 at a time to reach the photoelectric cell 21.

Light from the source 20 is formed into a parallel beam by a lens 24. Light transmissive discs 25 and 26 constructed of, for example, glass are placed on either side of the opaque plate 18. Discs 25 and 26 are sealed to the inner wall of the support housing 10 and thereby form a chamber 28 surrounding the opaque plate 18. Where the tubing 11 is filled with a fluid under pressure as is usually the case in an earth-drilled borehole, this chamber 28 is filled with a light transmissive fluid which is maintained at a pressure corresponding to the fluid pressures occurring in the tubing 11 in order to prevent leakage of any such tubing fluids into the chamber 28. A pressure balancing diaphram 29 is provided for the chamber 28. An additional lens 27 serves to focus light passing through the selector disc 22 onto the photoelectric cell 21.

The selector disc 22 is caused to rotate by a motor 30 which is coupled thereto by means of a suitable gear drive represented by disc gear 31a, shaft gear 31b and the gear teeth on the outer edge of selector disc 22. The gearing should be such that the selector disc 22 rotates at a relatively rapid rate compared to any desired rate of longitudinal movement of the support housing 10 up through the tubing 11. Auxiliary spring arms may, if desired, be fixed to the exterior of the support housing 10 either above or below the opaque plate 18 or both in order to assist in keeping such support housing properly centered in the tubing 11. Where fixed below, they may be placed intermediate the feeler arms 13.

Referring now to FIG. 4 of the drawings, there is shown a wiring diagram for the apparatus of FIG. 1, the opaque plate 18 and the selector disc 22 being represented in a symbolic manner. Equipment located at the surface of the well or exterior to the tubing is shown in the upper portion of this figure. Energizing voltage for the light source 20 and motor 30 is supplied from a surface or exterior source 33 by way of a transformer 34 and conductors 35 and 36 of cable 12. Direct current operating potential for the photoelectric cell 21 is developed by a D.C. power supply 37 which is coupled to the source 33 by way of a transformer 38. A resistor 39 forms a load for the photoelectric cell 21. Electrical signals developed across the load resistor 39 are transmitted to the surface by an additional conductor 41 of the cable 12. The grounded center taps on transformers 34 and 38 serve to form a phantom ground return circuit for the conductor 41.

The apparatus of the present invention also includes circuit means coupled to the far end of the cable conductor 41 and repsonsive to the sequence of output pulses for providing an indication of the internal dimensions of the tubing 11. Such circuit means is indicated in FIG. 4 by the signal processing circuits 42 which serve to develop suitable signals for driving indicating meters 43 and 44 which may, where desired, be separate recording units of a conventional recording galvanometer apparatus in which the recording chart is moved in synchronism with the movement of the housing 10 through tubing 11 so as to provide a permanent record of the tubing dimensions at the various depths or locations in the tubing.

Considering now the operation of the tubing measuring apparatus thus far described, the support housing 10 is moved through the tubing 11 and the feeler members 13 are urged against the inner wall thereof. Accordingly, the position of each feeler member is dependent on the radial dimension of the tubing in the vicinity of such feeler member. As this dimension varies with variations in the shape of the tubing 11, the feeler members 13 move in and out and, in turn, move the pistons 15 in and out, thus changing the sizes of the apertures 19. As a result, the amount of light coming out of each of the apertures 19 varies in accordance with the radial position of the corresponding feeler arm 13. Selector disc 22 by way of its aperture 23 then serves to select only the light from one of the apertures 19 at a time. This selector disc 22 is caused to rotate by the motor 30 and hence a sequence of light impulses are supplied to the photoelectric cell 21.

As a result of the foregoing, there is developed across the load resistor 39 of the photocell 21 a sequence of electrical pulses, each pulse having an amplitude value in accordance with the amount of light contained in the light impulse which gave rise thereto. These pulses are represented by pulses A of the graph of FIG. 5. A reference pulse indicated by pulse B of FIG. 5 may be generated once each cycle by providing an aperture 40 having a fixed and non-variable size in the opaque structure 18. This pulse may be used either to calibrate or to synchronize the system or both.

The resulting sequence of electrical pulses appearing across the load resistor 39 are supplied to the input of signal processing circuits 42 and must be processed by the circuits 42 so as to provide readily-interpretable and meaningful indications to the operator of the apparatus. In addition, the indications should afford a continuous measure of the shape and dimensions of the tubing as the downhole portion of the measuring apparatus is moved continuously through the tubing. To this end, the present form of apparatus provides suitable driving signals for the recording units 43 and 44 for forming a continuous log or graph of the type indicated in FIG. 6. Curve C of FIG. 6 represents a continuous record as a function of depth in the tubing of the maximum feeler arm displacement which, for the case where it is desired to determine the amount of corrosion of the tubing 11, corresponds to the maximum degree of corrosion. A signal suitable for forming this curve may be obtained by measuring the amplitude of the largest one of pulses other than the reference pulse B of the pulse sequence coming from the photocell 21. A second curve D is provided on the FIG. 6 graph and serves to provide a continuous record of the number of feeler arms which are displaced in excess of a reference displacement value which may correspond to the nominal diameter of the tubing 11. Curve D then serves to provide an indication of the degree of circumferential symmetry of the inner wall of the tubing 11. This curve may be obtained by counting the number of pulses which exceed a reference value indicated, for example, by the level E on the FIG. 5 graph.

Suitable circuits for use in the signal processing unit 42 of FIG. 4 are indicated in the block diagram of FIG. 7. The sequence of pulses supplied to the processing circuits 42 of FIG. 7 is first applied to and translated by a variable gain amplifier 50 and then applied to a clipper circuit 51. Clipper 51 serves to translate only those pulses which exceed a certain voltage value corresponding to the level E in FIG. 5. To this end, the clipper 51 includes a suitable bias voltage for keeping the clipper circuit disabled until the pulse amplitudes exceed the reference level.

The sequence of pulses from the variable gain amplifier 50 is also supplied to a second clipper circuit 53 which includes a bias voltage for enabling translation of only pulse amplitudes which exceed a second reference level indicated by the level F in FIG. 5. This reference level is set sufficiently high so that only the upper portion of the reference pulse B will be passed thereby. This upper tip of the reference pulse B is then supplied by way of an amplifier 54 to a comparator circuit 55. Also supplied to the comparator circuit 55 is a reference voltage from voltage source 56. The comparator 55 then serves to compare the amplitude of this portion of the pulse B with the reference voltage so as to develop an error signal if this portion of the reference pulse B does not have the correct value. This error signal is then amplified and detected by an amplifier and detector unit 57 which thus serves to develop an automatic-gain-control voltage which is supplied back to the variable gain amplifier 50 for controlling the gain thereof. The feedback loop thus formed serves to calibrate or stabilize the operation of the system including the downhole portion thereof. In other words, if the signal gain of the apparatus including the downhole portion should suffer an undesirable change, then the gain of the amplifier 50 is adjusted in an opposite manner to compensate therefor. This enables the amplitude of the output pulses from the amplifier 50 to be dependent only on the displacement of the feeler arms and not to undesired changes in the operating characteristics of the apparatus, particularly the downhole portion of the apparatus.

The selected reference pulse portions at the output of the clipper 53 are also supplied by way of the amplifier 54 to a gated amplifier 52 for removing the reference pulses from the pulse sequences coming from clipper 51.

Thus the reference pulse supplied by way of amplifier 54 serve to disable the gated amplifier 52 during the occurrence of the reference pulse in the sequence coming from the clipper 51. As a result, there is periodically supplied to an amplifier-limiter unit 58 a sequence of pulses corresponding to the feeler arm pulses A which exceed the reference level E of FIG. 5.

The amplifier-limiter 58 serves to amplify each of the pulses supplied thereto by a large amount and then to clip them or limit them at an arbitrary level such that all of the resulting output pulses will have the same peak amplitude. The resulting pulses are then supplied to a pulse counter circuit 59 which may take the form of a simple integrator circuit which provides an output signal proportional to the number of pulses. The resulting output signal is then a direct current signal having a value depending on the number of feeler arms which are displaced in excess of a reference value and such output signal is suitable for driving the recorder unit 44 for providing the curve D of FIG. 6.

The pulse sequence from the gated amplifier 52 is also supplied to a peak detector circuit 60 which serves to provide an output signal corresponding to the peak value of the pulse sequence. This, in turn, corresponds to the amplitude of the maximum pulse. This output signal is then supplied to the recorder unit 43 for providing the curve C of FIG. 6. When the signal for the recorder unit 43 is developed in this manner, the recorder 43 will indicate a zero or minimum value whenever none of the feeler arm pulses A exceed the reference level E corresponding to the nominal diameter of the tubing 11.

Because the processing circuits 42 are measuring direct current values, namely, the amplitudes of the various pulses, suitable direct current restorer circuits may be utilized where necessary in order to counteract any alternating current coupling or transmission of the pulse signals.

Referring now to FIG. 8 of the drawings there is shown another embodiment of the invention wherein a different form of transducer means is utilized for developing the sequence of electrical pulses representative of feeler arm displacement. As before, the apparatus includes a support housing 70 and a plurality of feeler arms 71 adapted to be urged against the inner wall of the tubing 11 as the support housing 70 is moved longitudinally through the tubing 11. The transducer means in this case, however, includes a plurality of mechanically adjustable electrical elements represented by potentiometers 72 mounted within the support housing 70 and individually and mechanically coupled to one of the feeler members 71. In particular, each wiper arm 73 of the potentiometers 72 is pinned to a feeler member 71 at a point 74, the feeler member 71 being pivoted on the edge of a slot in housing 70 at a point 75. Springs 76 contained within the housing 70 are connected between the wiper arms 73 and internal ears 76a and serve to urge the feeler arms 71 outward against the wall of the tubing 11. Adjustable stops 77 may be provided in the bottom piece of the housing 70 to set the minimum displacement of the feeler members 71.

In order to develop the pulse sequence, a movable or rotating commutator switch 78 is provided for selectively applying a suitable energizing voltage from a source represented by a D.C. power supply 79 to the adjustable potentiometers 72. Rotation of the commutator switch 78 is provided by a motor 80. Where necessary to prevent leakage of fluids contained in the tubing 11 into the interior of the upper portion of the support housing 70, which is separated from the lower portion by a partition member 70a, the interior of this upper portion may be filled with a nonconductive fluid such as oil which is maintained under a pressure corresponding to that of the fluid in the tubing 11. A pressure balancing diaphragm 70b serves to maintain the desired pressure balance.

As shown in FIG. 9, which represents a wiring diagram for the apparatus of FIG. 8, the power supply 79 and motor 80 may be energized by the same exterior source by way of suitable cable conductors 35 and 36 in the same manner indicated in FIG. 4. In addition, the sequence of output pulses developed by the downhole portion of the apparatus may be supplied by an appropriate cable conductor 41 to the same exterior signal processing circuits, as indicated in FIG. 4 and in more detail in FIG. 7. Each of the potentiometers 72 is connected between one of the contacts of switch 78 and a common load resistor 81 thereby to provide a separate potentiometer path for each of the feeler members 71. The other end of load resistor 81 is grounded to the housing 70.

In operation, assuming the potentiometers 72 and wiper arms 73 to be connected and coupled as shown in the drawings, then as one of the feeler members 71 is moved outwardly by an increasing amount, the wiper arm 73 on the corresponding potentiometer 72 serves to cause an increasing portion of such potentiometer to be shorted out. This lowers the resistance value in a particular potentiometer path between the commutator switch 78 and the common output load resistor 81. Conversely, the resistance value in the potentiometer path will increase if the feeler member is moved inwardly. In this manner, the resistance value in each of the potentiometer paths is adjusted in accordance with the particular radial position of the corresponding feeler member. The commutator switch 78 then serves to periodically supply the direct current voltage from power supply 79 to each of the potentiometer paths in sequence so that a sequence of electrical output pulses is developed across common load resistor 81. The amplitude value of each pulse in the sequence is determined by the resistance value of the corresponding potentiometer 72.

A low impedance or zero resistance calibration path 82 may be provided between the commutator switch 78 and the common load impedance 81 in order to generate a reference pulse. In order that this reference pulse may always be larger than any of the feeler arm pulses, the impedance of this path should always be lower than that of any of the potentiometer 72 paths. To this end, fixed resistors 83 may be provided in series with each of the feeler arm potentiometers 72 or, instead, suitable mechanical stops may be provided on the potentiometers for preventing them from assuming a zero resistance value.

The resulting sequence of electrical pulses across the common load resistor 81 corresponds to the pulse sequence indicated in FIG. 5. Such pulse sequence may then be supplied by the transmission line 41 to signal processing and recorder circuits of the type previously mentioned.

From the foregoing descriptions of the various embodiments of the invention, it is seen that tubing measuring apparatus constructed in accordance therewith provides immediately available and readily interpretable indication of the shape or degree of circumferential symmetry of the tubing under investigation and at the same time enables the downhole portion of the apparatus to be moved continuously through the tubing.

While particular embodiments of the present invention have been shown and described, it will be apparent to those skilled in the art that various changes and modifications may be made therein without departing from this invention in its broader aspects, and therefore the aim in the appended claims is to cover all such changes and modifications as fall within the true spirit and scope of this invention.

I claim:

1. Tubing measuring apparatus comprising: a support adapted to be moved through a length of tubing; a plurality of feeler members attached to the support, transducer means coupled to each feeler member and including a single sensing means for repetitively developing in the single sensing means a sequence of output pulses, each pulse in the sequences being representative of the displacement of a different one of the feeler members; and means responsive to the pulse sequence for providing a continuous presentation of the internal characteristics of the tubing.

2. Tubing measuring apparatus comprising: a support adapted to be moved through a length of tubing; a plurality of feeler members attached to the support; transducer means coupled to each feeler member for developing a sequence of electrical output pulses, each of such pulses having an amplitude value representative of the displacement of a different one of the feeler members; and amplitude-selective pulse counting circuit means responsive to the sequence of electrical output pulses for providing an indication of the degree of circumferential symmetry of the inner wall of the tubing.

3. Tubing measuring apparatus comprising: a support adapted to be moved through a length of tubing at a pretermined speed; a plurality of feeler members movably attached to the support and adapted to be urged against the wall of the tubing; a plurality of transducer mechanisms individually coupled to a different one of said feeler members and each capable of developing an electrical signal component representative of the displacement of the corresponding feeler member; rotating selector means for enabling the transducer mechanisms to repetitively develop their electrical signal components in sequence one after the other; means for continuously rotating the selector means at a speed substantially greater than the speed of the support through the tubing; electrical signal transmission means coupled to the transducer mechanisms for translating the sequences of electrical signal components; and circuit means coupled to said signal transmission means and responsive to the sequences of electrical signal components for providing a continuous indication of the internal dimensions of the tubing.

4. Tubing measuring apparatus comprising: a support adapted to be moved through a length of tubing; a plurality of feeler members movably attached to the support and adapted to be urged against the wall of the tubing; a plurality of transducer mechanisms individually coupled to a different one of said feeler members and each capable of developing an electrical signal component representative of the displacement of the corresponding feeler member; means for developing a fixed reference signal component; selector means for enabling the transducer mechanisms to develop their electrical signal components in sequence one after the other and for enabling the reference signal component to be included in this sequence; a single electrical transmission line coupled in common to the transducer mechanisms for translating the sequence of electrical signal components; circuit means coupled to said transmission line and responsive to the sequence of electrical signal components for providing an indication of the internal dimensions of the tubing; and circuit means responsive to the reference signal component for minimizing any variations in such component.

5. Tubing measuring apparatus comprising: a support adapted to be moved through a length of tubing; a plurality of feeler members movably attached to the support and adapted to be urged against the wall of the tubing; a plurality of transducer mechanisms individually coupled to a different one of said feeler members and each capable of developing an electrical signal representative of the displacement of the corresponding feeler member; selector means for enabling the transducer mechanisms to develop their electrical signals in sequence one after the other for developing a sequence of electrical pulses, each of such pulses having an amplitude value representative of the displacement of one of the feeler members; electrical signal transmission means coupled to the transducer mechanisms for translating the sequence of electrical pulses; and amplitude-selective pulse counting circuit means coupled to said signal transmission means and responsive to the sequence of electrical pulses for providing an indication of the degree of circumferential symmetry of the inner wall of the tubing.

6. Tubing measuring apparatus comprising: a support adapted to be moved through a length of tubing; a plurality of feeler members movably attached to the support and adapted to be urged against the wall of the tubing; a plurality of transducer mechanisms individually coupled to a different one of said feeler members and each capable of developing an electrical signal component representative of the displacement of the corresponding feeler member; selector means for enabling the transducer mechanisms to develop their electrical signal components in sequence one after the other for developing a sequence of electrical pulses, each of such pulses having an amplitude value representative of the displacement of one of the feeler members; electrical signal transmission means coupled to the transducer mechanisms for translating the sequence of electrical pulses; and peak detector circuit means coupled to said signal transmission means and responsive to the sequence of electrical pulses for providing an indication of the maximum feeler member displacement.

7. Tubing measuring apparatus comprising: a support adapted to be moved through a length of tubing; a plurality of feeler members movably attached to the support and adapted to be urged against the wall of the tubing; a plurality of transducer mechanisms individually coupled to a different one of said feeler members and each capable of developing an electrical signal component representative of the displacement of the corresponding feeler member; selector means for enabling the transducer mechanisms to develop their electrical signal components in sequence one after the other for developing a sequence of electrical pulses, each of such pulses having an amplitude value representative of the displacement of one of the feeler members; a single electrical transmission line coupled in common to the transducer mechanisms for translating the sequence of electrical pulses; amplitude-selective pulse counting circuit means coupled to said transmission line and responsive to the sequence of electrical pulses for providing an indication of the degree of circumferential symmetry of the inner wall of the tubing; and peak detector circuit means also coupled to said transmission line and responsive to the sequence of electrical pulses for providing an indication of the maximum feeler member displacement.

8. Tubing measuring apparatus comprising: a support adapted to be moved through a length of tubing; a plurality of feeler members movably attached to the support and adapted to be urged against the wall of the tubing; a plurality of mechanical-to-optical transducers individually coupled to a different one of said feeler members for individually developing a light output signal representative of the displacement of one of the feeler members; an optical-to-electrical photoelectric transducer; selector means for enabling the light output signals to be supplied to the photoelectric transducer in sequence one after the other; an electrical transmission line coupled to the photoelectric transducer for translating the resulting sequence of electrical signal; and circuit means coupled to said transmission line and responsive to the sequence of electrical signals for providing an indication of the internal dimensions of the tubing.

9. Tubing measuring apparatus comprising: a support housing adapted to be moved through a length of tubing; a plurality of feeler members movably attached to the support housing and adapted to be urged against the wall of the tubing; an opaque structure mounted within said support housing, such structure having a plurality of light transmissive apertures therein; a light source positioned on one side of said opaque structure; a plurality of movable shutter members individually coupled to a different one of said feeler members and each adapted to alter the amount of light passing through one of said apertures in accordance with the displacement of the corresponding feeler member; a photoelectric device positioned on the other side of the opaque structure; a movable selector member having a light transmissive aperture therein for enabling the light from only one opaque structure aperture at a time to reach the photoelectric device thereby to enable such device to develop a sequence of output pulses, each of such pulses having an amplitude value in accordance with the displacement of one of the feeler members; an electrical transmission line coupled to the photoelectric device for translating the sequence of output pulses to a location exterior to the tubing; and circuit means coupled to the other end of said transmission line and responsive to the sequence of output pulses for providing an indication of the internal dimensions of the tubing.

10. Tubing measuring apparatus comprising: a support housing adapted to be moved through a length of tubing at a predetermined speed; a plurality of feeler members movably attached to the support housing and adapted to be urged against the wall of the tubing; a plurality of mechanically adjustable electrical elements mounted within said support housing and individually and mechanically coupled to a different one of said feeler members so that the electrical characteristic of each such element corresponds to the displacement of one of the feeler members; electrical energy supply means for energizing the electrical elements so that each may develop an output signal having a value corresponding to the mechanical adjustment thereof; an electrical transmission line for translating electrical signals to a location exterior to the tubing; a rotating commutator switch for enabling only one electrical element at a time to supply its output signal to the transmission line thereby to repetitively enable a sequence of output pulses to be supplied to such transmission line where each of such pulses has an amplitude value in accordance with the displacement of one of the feeler members; means for continuously rotating the commutator switch at a speed substantially greater than the speed of the support housing through the tubing; and circuit means coupled to the far end of the transmission line and responsive to the sequences of output pulses for providing a continuous and integrated presentation of the internal dimensions of the tubing.

References Cited in the file of this patent

UNITED STATES PATENTS

| | | |
|---|---|---|
| 2,656,613 | Goble | Oct. 27, 1953 |
| 2,691,889 | Dion et al. | Oct. 19, 1954 |
| 2,771,685 | Kinley | Nov. 27, 1956 |
| 2,771,686 | Hamontre et al. | Nov. 27, 1956 |